W. L. HAMILTON.
TRANSPORTATION BY MEANS OF VEHICLES AND MEANS FOR USE IN CONJUNCTION THEREWITH.
APPLICATION FILED FEB. 26, 1918.
1,280,992.
Patented Oct. 8, 1918.
4 SHEETS—SHEET 3.
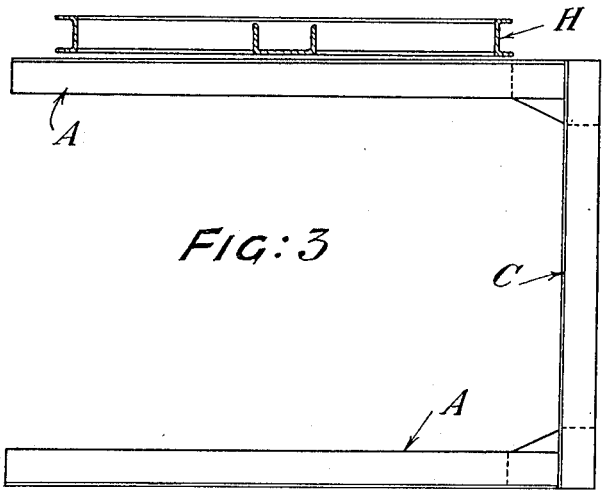
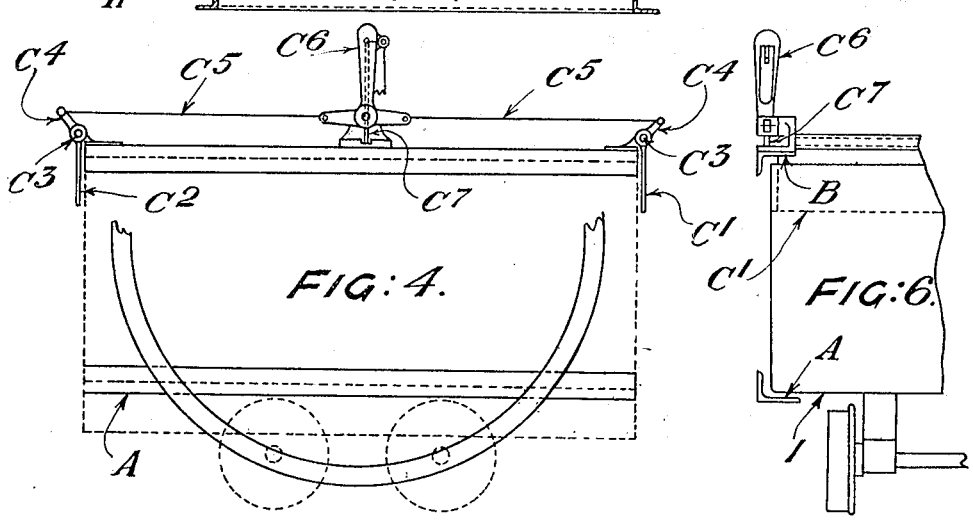
Inventor.
William Lindsay Hamilton.
By T. Walter Fowler
Atty.

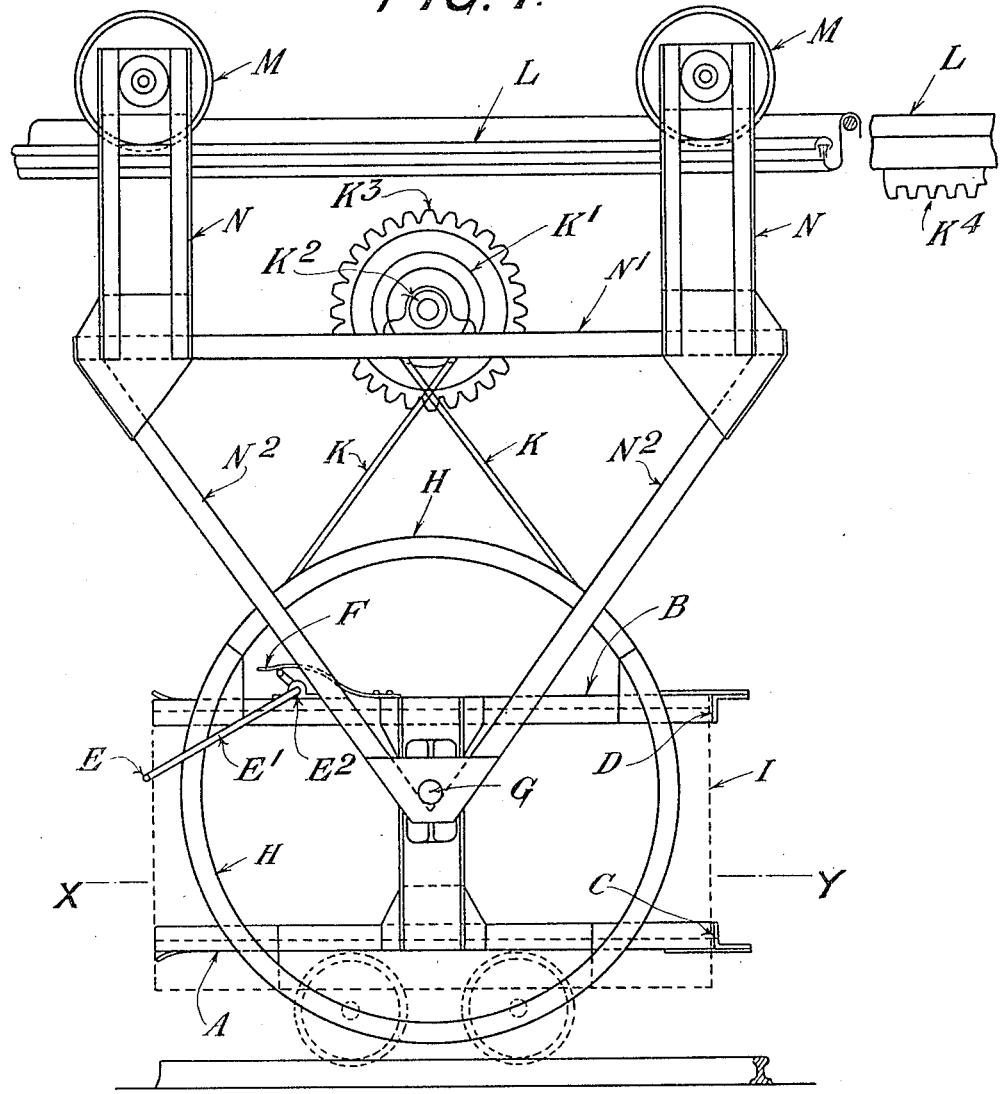

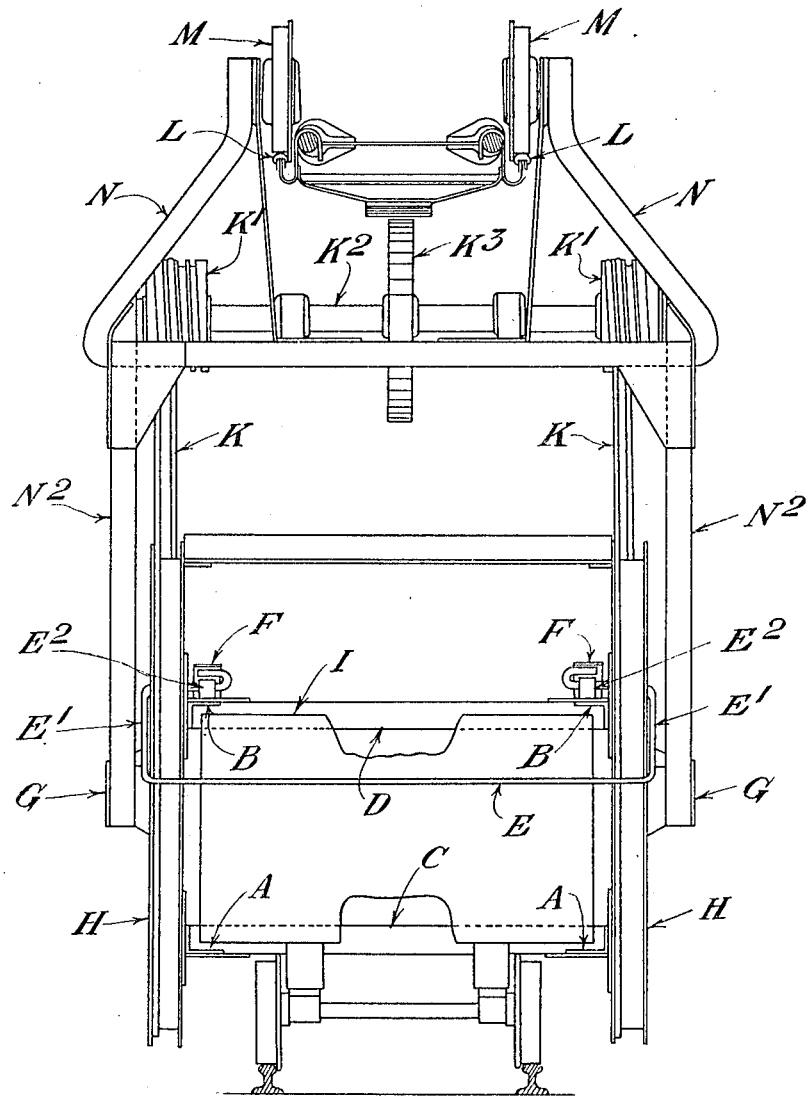

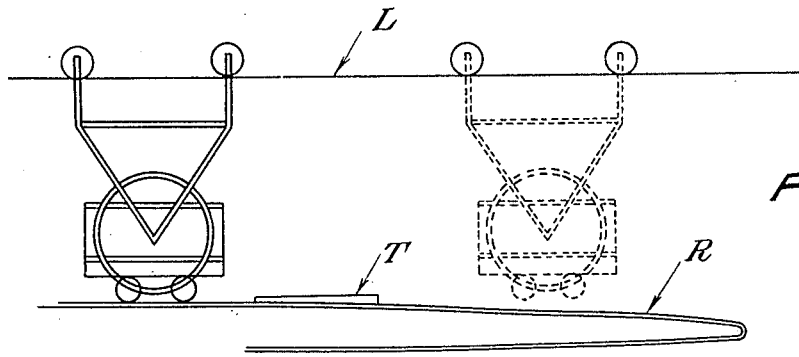
FIG: 7.
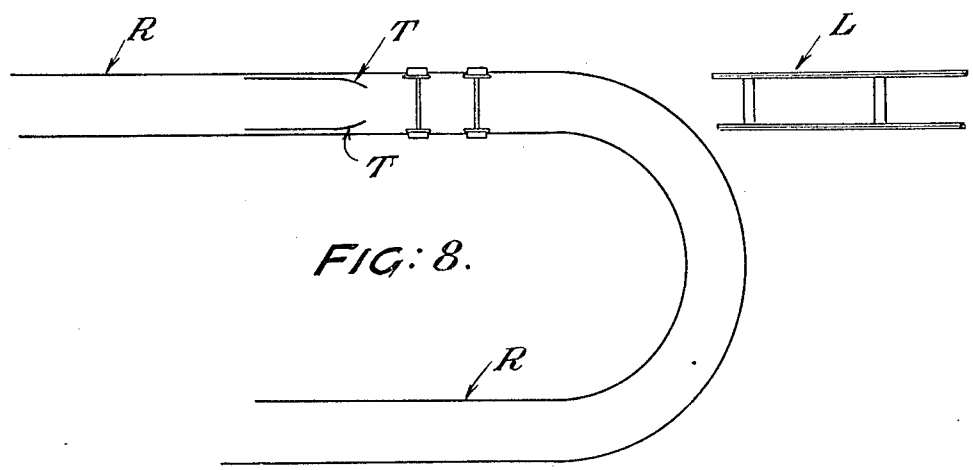
FIG: 8.
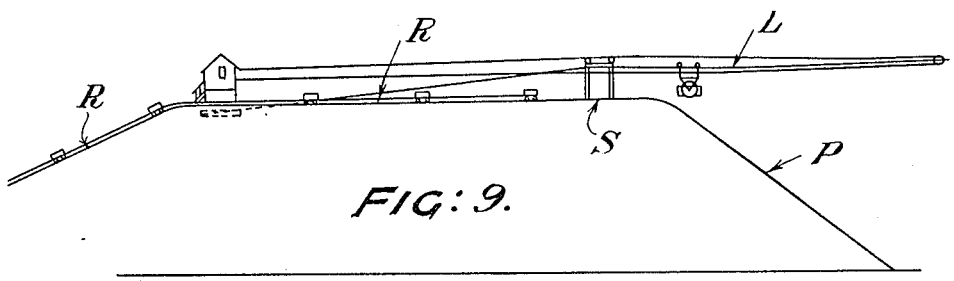
FIG: 9.

UNITED STATES PATENT OFFICE.

WILLIAM LINDSAY HAMILTON, OF GLASGOW, SCOTLAND.

TRANSPORTATION BY MEANS OF VEHICLES AND MEANS FOR USE IN CONJUNCTION THEREWITH.

1,280,992.  Specification of Letters Patent.  Patented Oct. 8, 1918.

Application filed February 26, 1918. Serial No. 219,260.

*To all whom it may concern:*

Be it known that I, WILLIAM LINDSAY HAMILTON, a subject of the King of Great Britain and Ireland, and of 81 Mitchell street, Glasgow, Scotland, have invented new and useful Improvements in or Connected with Transportation by Means of Vehicles and Means for Use in Conjunction Therewith, of which the following is a specification.

This invention relates to that method of transport in which the substance to be carried is contained within a vehicle which in transportation is supported at one time by resting upon a surface track and at another time by suspension from an aerial railway. An example of transportation in which this method is applied is described in the specification of United States Patent No. 1,049,709, dated 7th January, 1913, granted to the present applicant. The method described in that specification involves the use of a vehicle, having wheels, which at one time is traversed along a track bearing upon the ground or other base support, and at another time is supported by resting upon the floor of a carriage suspended from an aerial railway. The transition in the support of the vehicle from direct support by the ground to that of support upon the carriage associated with the aerial railway, is what may be termed abrupt, in that it is effected by moving the vehicle from its base support onto the floor of the suspended carriage while the carriage is at rest.

According to this invention transportation is effected by means of a vehicle which is adapted to travel in one part of its passage while supported on a surface track and in another part of the passage while suspended from a carriage mounted on an aerial railway, and the invention involves an improved method of transition from direct support by the ground to direct support by suspension, or vice versa, which is effected while the carriage (supported by the aerial railway) and the vehicle (supported by the surface track) are in motion and in consequence of a divergence of the paths of support (the surface track and the aerial track) when passing from support by the ground to support by suspension and by a convergence of the paths of support when passing from support by suspension to support by the ground, whereby the support provided for suspending the vehicle from the carriage of the aerial railway is brought into operation or removed.

An example of the application of this improved method will now be described.

In the following description, it will be convenient to consider that wheeled vehicles are used, but it is to be understood that wheels are not essential, for example, sliding vehicles might be substituted. Moreover, it will be assumed that the vehicles have flanged wheels and that tracks are provided, but these also are not essential.

The conditions under consideration may be taken as those in which hutches, constituting the vehicles, are used for conveying refuse, say, from a shale plant to a refuse heap or bing, the position of discharge being above the ground level. For this purpose, a surface rail track is provided along which the hutches are moved into position for transport by an aerial railway where the method of support is suspension. At the junction of the systems, the vehicle is brought within a carriage comprising a front end, and side supports, and over base supports, the latter being clear of the base of the hutch, and the side supports such as to permit the free entry of the hutch. In bringing a hutch into position the front end support may act to restrict the advance of the hutch, and when the hutch is in position within the confines of the supports with which the carriage is provided, a back end support is applied, or both the back and front end supports are then applied to lock the hutch against longitudinal movement entirely, or with some longitudinal freedom relative to the end supports. The freedom for lateral movement may be slight, and, if desired, provision may be made for reducing the extent of this freedom or preventing it entirely. If the vehicle is to be inverted or greatly inclined at any time, upper supports are provided to sustain the vehicle when this condition occurs.

With the hutch in position while still supported an the rails of the track and the back end support applied, if the front end support is a fixture, or with the end supports applied if both are adjustable, the transition from support upon the rails to suspension from the aerial railway is produced by the movement of the carriage and with it the hutch and in consequence of a divergence of the paths of support (the surface track and the aerial track), with the result that the base supports come into operation as the carriage progresses and the hutch is sustained thereby.

Some examples of construction according to this invention and application of their use will now be described with reference to the accompanying drawings in which:—

Figure 1 is a side elevation with a hutch in position shown in dotted lines, Fig. 2 is an end view with the hutch shown having portions broken away, and Fig. 3 is a sectional plan with the hutch omitted, the section of which is taken about the line X—Y of Fig. 1, showing the lower part of the carriage.

Fig. 4 is an elevation, Fig. 5 a plan, and Fig. 6 is an end view of a portion of a modified construction of carriage.

Fig. 7 is a side view and Fig. 8 is a plan showing a system of tracks and means to be described.

Fig. 9 is a side view illustrating an example of the application of the invention for conveying shale refuse to a bing.

In the construction of carriage illustrated at Figs. 1, 2 and 3, the supports are embodied in a framing of rectangular form, comprising longitudinal base plates constituting base supports A to engage with the bed of a hutch 1, and longitudinal strips constituting upper supports B for the upper edges of the sides of the hutch to pass under, associated with a front end abutment C at the base and a front end abutment D at the top. Transverse supports, not shown in the drawing, may also be provided for the underside of the hutch at the front end and for the upper edges of the front and back ends of the hutch to pass under. As an example of back end locking means the framing is provided with a pivoted yoke having a transverse bar E adapted to be brought across the back end when the hutch 1 is in position. This yoke comprises longitudinal side rods $E^1$ pivoted about $E^2$ at their forward ends at a distance from the back end of the framing, a spring F being provided for retaining the yoke in position when set either in its locking position or in position for admitting a hutch, the spring acting on extensions of the side rods $E^1$.

The carriage which is suspended from an aerial track L comprises wheels M mounted upon a longitudinal head having upright parts N, N, connected by longitudinal parts $N^1$ from the ends of which ties $N^2$ extend downward and converge at or about an axis G, the ties $N^2$ being fixed to a plate or bracket at that position comprising bearings for pivots about which the framing is carried.

The framing in this case is adapted to turn about the axis G, which is located, say, midway between the ends, above the center of the load, the axis G might, however, be about the center of the load. The gear illustrated for tilting the frame about the axis G consists of two circular rings H at the sides of the frame concentric to the axis G, to which flexible connections K wound around drums $K^1$ are fixed. These drums are fixed upon a shaft $K^2$ upon which a toothed wheel $K^3$ is secured, which is adapted to engage with a rack $K^4$ mounted on the aerial track L at a position where the dumping is to take place. The engagement of the toothed wheel $K^3$ with the rack $K^4$ causes the wheel $K^3$ to turn and so tilt the frame on its outward journey and restore it to its upright position as the carriage returns on its inward journey. In some cases a circular ring H, drum $K^1$ and flexible connection K may be fitted at one side only.

In the system illustrated with reference to Figs. 1, 2 and 3, the full hutch is moved into position within the confines of the framing of the carriage and removed therefrom at the back end. Provision may, however, be made whereby the full hutch is moved into position at the back end and after being emptied is removed therefrom at the front end, the surface track or rails being suitably extended and arranged for the purpose. For example, the empty hutches when removed may travel by gravity along rails which extend to a return track. For this purpose a carriage, as illustrated at Figs. 4, 5 and 6, may be used, comprising longitudinal base supports A and longitudinal upper supports B, and a front end support $C^1$ and a back end support $C^2$, pivoted to turn about axes $C^3$ respectively, and be operated by means of levers $C^4$, connecting links $C^5$ and controlling lever $C^6$ having two arms to which the links $C^5$ are connected and a bolt $C^7$ adapted to lock the lever and the end supports $C^1$ $C^2$ in the position indicated, or by withdrawing the bolt $C^7$ turn the end supports $C^1$ $C^2$ into an approximately horizontal position to permit a hutch to be brought into position by passing in at the back end and removed therefrom at the front end.

A carriage of this character may be used in conjunction with a system of aerial and surface tracks as illustrated, by way of example, at Figs. 7 and 8, wherein an aerial track L and rails R of a surface track are provided which at the junction whereat transition occurs have portions in alinement which diverge in the direction toward which the aerial track L extends, the rails R of the surface track being extended and arranged so that an empty hutch may be removed from the carriage and advanced along the surface track in the direction toward which the aerial track extends and by gravity or otherwise travel along the extension so as to be returned for loading, and thus allow full hutches to be advanced in succession into position within the confines of the carriage for transport by the aerial track.

In systems comprising hutches having flanged wheels and rail tracks, provision may be made for so guiding the hutch, that in passing from suspension to surface support the wheels of the hutch will be suitably guided to engage with the rails. For example, as indicated in Figs. 7 and 8, guides T may be provided to engage with the inner sides of the wheels of a hutch as the hutch supported in the carriage approaches the position in its return journey where the aerial and surface tracks converge to permit the transition from support by suspension to support by the ground.

In Fig. 9, a bing P is indicated as furnished with an aerial railway L and surface track R, the junction of the systems being situated at S.

I claim:—

1. Transportation by means of a vehicle, comprising a surface track upon which the vehicle is adapted to be supported in one part of its passage, and an aerial track by which the vehicle is adapted to be supported by suspension in another part of its passage, a junction whereat transition by support upon the surface track to support by suspension, or vice versa, is adapted to be effected, at which junction a portion of the surface track is below a portion of the aerial track, the two portions being in alinement and divergent from one another in the direction toward which the aerial track extends, a carriage suspended from the aerial track having means within the confines of which, while the carriage is at the junction, portions of the vehicle, while the vehicle is supported upon the surface track at the junction, are adapted to be brought by bringing the vehicle into position, which means comprise base supports over which portions of the vehicle when in position are brought and front and back end supports for restricting longitudinal movement of the vehicle relative to the carriage, for the purposes set forth.

2. A vehicle having flanged wheels, a surface track having rails upon which the vehicle is adapted to be supported and guided in one part of its passage by the wheels resting upon the rails, and an aerial track by which the vehicle is adapted to be supported by suspension in another part of its passage, a junction whereat transition by support upon the surface track to support by suspension, or vice versa, is adapted to be effected, at which junction a portion of the surface track is below a portion of the aerial track, the two portions being in alinement and divergent from one another in the direction toward which the aerial track extends, a carriage suspended from the aerial track having means within the confines of which, while the carriage is at the junction, portions of the vehicle, while the vehicle is supported upon the surface track at the junction, are adapted to be brought by bringing the vehicle into position, which means comprise base supports over which portions of the vehicle when in position are brought and front and back end supports for restricting longitudinal movement of the vehicle relative to the carriage, for the purposes set forth.

3. A vehicle having flanged wheels, a surface track having rails upon which the vehicle is adapted to be supported and guided in one part of its passage by the wheels resting upon the rails, and an aerial track by which the vehicle is adapted to be supported by suspension in another part of its passage, a junction whereat transition by support upon the surface track to support by suspension, or vice versa, is adapted to be effected, at which junction a portion of the surface track is below a portion of the aerial track, the two portions being in alinement and divergent from one another in the direction toward which the aerial track extends, a carriage suspended from the aerial track having means within the confines of which, while the carriage is at the junction, portions of the vehicle, while the vehicle is supported upon the surface track at the junction, are adapted to be brought by bringing the vehicle into position, which means comprise base supports over which portions of the vehicle when in position are brought and front and back end supports for restricting longitudinal movement of the vehicle relative to the carriage, and means for so guiding the vehicle that in passing from suspension to surface support the wheels of the vehicle will be suitably guided to engage the rails of the surface track, for the purposes set forth.

4. A surface track upon which a vehicle is adapted to be supported in one part of its passage, and an aerial track by which the vehicle is adapted to be supported by suspension in another part of its passage, a junction whereat transition by support upon the surface track to support by suspension, or vice versa, is adapted to be effected, at which junction a portion of the surface track is below a portion of the aerial track the two portions being in alinement and divergent from one another in the direction toward which the aerial track extends, a carriage suspended from the aerial track having a frame mounted to turn about a horizontal axis, the frame comprising base supports, upper supports and front and back end supports, within the confines of which, while the carriage is at the junction, portions of the vehicle, while the vehicle is supported upon the surface track at the junction, are adapted to be brought by bringing the vehicle into position, for the purposes set forth.

5. A surface track upon which a vehicle is adapted to be supported in one part of its passage, and an aerial track by which the vehicle is adapted to be supported by suspension in another part of its passage, a junction whereat transition by support upon the surface track to support by suspension, or vice versa, is adapted to be effected, at which junction a portion of the surface track is below a portion of the aerial track, the two portions being in alinement and divergent from one another in the direction toward which the aerial track extends, a carriage suspended from the aerial track having a frame mounted to turn about a horizontal axis, the frame comprising base supports, upper support and front and back end supports, within the confines of which, while the carriage is at the junction, portions of the vehicle while the vehicle is supported upon the surface track at the junction, are adapted to be brought by bringing the vehicle into position, in combination with means associated with the frame and carried by the carriage and with means associated with the aerial track for turning the frame about its axis, for the purposes set forth.

6. A surface track upon which a vehicle is adapted to be supported in one part of its passage, and an aerial track by which the vehicle is adapted to be supported by suspension in another part of its passage, a junction whereat transition by support upon the surface track to support by suspension, or vice versa, is adapted to be effected, at which junction a portion of the surface track is below a portion of the aerial track, the two portions being in alinement and divergent from one another in the direction toward which the aerial track extends, a carriage suspended from the aerial track having a frame mounted to turn about a horizontal axis, the frame comprising base supports, upper support and front and back end supports, within the confines of which, while the carriage is at the junction, portions of the vehicle, while the vehicle is supported upon the surface track at the junction, are adapted to be brought by bringing the vehicle into position, a rack carried by the aerial railway, a toothed wheel mounted about a horizontal transverse axis carried by the carriage adapted to engage with the rack, for the purposes set forth.

7. A surface track upon which a vehicle is adapted to be supported in one part of its passage, and an aerial track by which the vehicle is adapted to be supported by suspension in another part of its passage, a junction whereat transition by support upon the surface track to support by suspension, or vice versa, is adapted to be effected, at which junction a portion of the surface track is below a portion of the aerial track, the two portions being in alinement and divergent from one another in the direction toward which the aerial track extends, a carriage suspended from the aerial track having a frame mounted to turn about a horizontal axis, the frame comprising base supports composed of longitudinal base plates, upper supports composed of longitudinal strips, front end and back end supports, a circular part fixed to the side of the frame, associated with a drum fixed upon a transverse shaft mounted on the carriage, a toothed wheel fixed on the shaft, a flexible connection wound around the drum and attached to the circular part, and a rack mounted on the aerial track for the toothed wheel to engage with, for the purposes set forth.

8. A vehicle having flanged wheels, a surface track having rails upon which the vehicle is adapted to be supported and guided in one part of its passage by the wheels, and an aerial track resting upon the rails, and an aerial track by which the vehicle is adapted to be supported by suspension in another part of its passage, a junction whereat transition by support upon the surface track to support by suspension, or vice versa, is adapted to be effected, at which junction a portion of the surface track is below a portion of the aerial track, the two portions being in alinement and divergent from one another in the direction toward which the aerial track extends, an extension of the rails of the surface track in the direction of but branching from that toward which the aerial track extends, a carriage suspended from the aerial track having means within the confines of which, while the carriage is at the junction, portions of the vehicle, while the vehicle is supported upon the surface track at the junction, are adapted to be brought by bringing the vehicle into position, which means comprise base supports over which portions of the vehicle when in position are brought and front and back end adjustable supports for restricting longitudinal movement of the vehicle relative to the carriage, for the purposes set forth.

WILLIAM LINDSAY HAMILTON.

Witnesses:
J. ALFRED BREWER,
DORA E. BAILLIE.